United States Patent
Brooks

(10) Patent No.: US 9,511,677 B1
(45) Date of Patent: Dec. 6, 2016

(54) SMARTER CHARGING OF PLUG-IN VEHICLES

(75) Inventor: Alexander Nelson Brooks, Pasadena, CA (US)

(73) Assignee: Google Inc., Mountain View, CA (US)

( * ) Notice: Subject to any disclaimer, the term of this patent is extended or adjusted under 35 U.S.C. 154(b) by 1180 days.

(21) Appl. No.: 13/309,407

(22) Filed: Dec. 1, 2011

(51) Int. Cl.
- *B60L 11/18* (2006.01)
- *H02J 3/32* (2006.01)
- *H02J 3/00* (2006.01)
- *H02J 3/14* (2006.01)

(52) U.S. Cl.
CPC ........ *B60L 11/1848* (2013.01); *B60L 11/1809* (2013.01); *B60L 11/1838* (2013.01); *B60L 11/1842* (2013.01); *B60L 11/1844* (2013.01); *H02J 3/008* (2013.01); *H02J 3/32* (2013.01); *B60L 2240/80* (2013.01); *H02J 2003/003* (2013.01); *H02J 2003/146* (2013.01); *Y02E 60/721* (2013.01); *Y02T 90/128* (2013.01)

(58) Field of Classification Search
CPC .... G06Q 10/06; G06Q 30/0823; G05B 15/02; G06F 1/26; G06F 1/66; G06F 1/266; B60L 11/1809; B60L 11/1838; B60L 11/1842; B60L 11/1844; B60L 11/1846; B60L 11/1848; B60L 11/1861; B60L 2240/80; Y02S 20/32; Y02S 30/12; Y02S 50/12; Y02T 10/78; Y02T 90/128
USPC ............................ 700/286–287, 295; 307/41
See application file for complete search history.

(56) References Cited

U.S. PATENT DOCUMENTS

| | | | | |
|---|---|---|---|---|
| 5,548,200 A * | 8/1996 | Nor et al. | ...................... | 320/109 |
| 5,696,367 A * | 12/1997 | Keith | ............................ | 235/381 |
| 8,178,997 B2 * | 5/2012 | Talkin et al. | .................... | 307/41 |
| 8,364,388 B2 * | 1/2013 | Naito | ................. | B60L 11/1809 |
| | | | | 701/439 |
| 8,509,976 B2 * | 8/2013 | Kempton | ............ | B60L 11/1824 |
| | | | | 320/101 |
| 8,909,390 B2 * | 12/2014 | Tonegawa | .......... | B60H 1/00257 |
| | | | | 165/202 |
| 8,963,493 B2 * | 2/2015 | Yano | ............................ | 320/109 |
| 9,043,038 B2 * | 5/2015 | Kempton | ............ | B60L 11/1824 |
| | | | | 180/65.275 |
| 9,367,052 B2 * | 6/2016 | Steven | ................... | G06Q 10/00 |
| 2005/0165511 A1 * | 7/2005 | Fairlie | .......................... | 700/286 |
| 2008/0039979 A1 * | 2/2008 | Bridges et al. | ............... | 700/292 |
| 2008/0263375 A1 * | 10/2008 | Sundstrom et al. | ......... | 713/320 |
| 2009/0088907 A1 * | 4/2009 | Lewis et al. | .................... | 700/286 |
| 2010/0017249 A1 * | 1/2010 | Fincham | .................. | B60L 3/12 |
| | | | | 705/412 |
| 2010/0314942 A1 * | 12/2010 | Talkin et al. | .................... | 307/41 |
| 2012/0112696 A1 * | 5/2012 | Ikeda | ................. | B60L 11/1816 |
| | | | | 320/109 |
| 2012/0249065 A1 * | 10/2012 | Bissonette | ............ | B60L 11/184 |
| | | | | 320/109 |

(Continued)

OTHER PUBLICATIONS

Brooks, A. et al., "Demand Dispatch," IEEE Power and Energy Magazine, May/Jun. 2010, pp. 20-29.

*Primary Examiner* — Crystal J Barnes-Bullock
(74) *Attorney, Agent, or Firm* — Fish & Richardson P.C.

(57) ABSTRACT

A system is described to enable charging of electric vehicles. A scheduler determines charging profiles for electric vehicles based on a time period within a day that is beneficial to an electric grid while still meeting the needs of drivers of the electric vehicles. A service provider charges the electric vehicles according to the charging profiles.

30 Claims, 4 Drawing Sheets

(56) References Cited

U.S. PATENT DOCUMENTS

2012/0303259 A1\* 11/2012 Prosser ................. H02J 7/0054
                                                                              701/400
2012/0303397 A1\* 11/2012 Prosser ................. H02J 7/0054
                                                                              705/7.12
2013/0229153 A1\* 9/2013 Sarkar ................. B60L 11/1809
                                                                              320/130

\* cited by examiner

SMARTER CHARGING OF PLUG-IN VEHICLES

BACKGROUND

1. Field of Art

The present disclosure generally relates to the field of charging plug-in vehicles.

2. Description of Related Art

An electric vehicle is propelled by an electric motor(s) that uses electrical energy stored in an energy storage device such as a battery. When the electrical energy stored in the energy storage device of an electric vehicle is depleted, the electric vehicle is connected or "plugged-in" to an electrical grid for charging. The electrical grid supplies power to the electric vehicle to charge the energy storage device used by the vehicle.

Generally, electric vehicles are encouraged to charge during off-peak hours of the electrical grid to prevent the increase of loads during on-peak hours. However, setting fixed charging times for off-peak charging of electric vehicles results in most electric vehicles being programmed to start charging at the same time. Given the typical usage of an electric vehicle, the time needed to recharge the vehicle may result in the vehicle being charged well before the time the owner needs the vehicle charged. Accordingly, there is no need to charge electric vehicles at the same off-peak time.

SUMMARY

Renewable energy generation using a natural resource (e.g., wind, sunlight, rain, tides, and geothermal heat) differs every day and during different times of a day depending on the weather. The embodiments disclosed herein provide continuously optimized scheduling of charging for electric vehicles. The electric vehicles are charged in a manner that helps grid operators integrate renewable energy generation to prevent these renewable sources from being wasted while at the same time meeting the needs of drivers to have their cars fully charged.

In one embodiment, a scheduler is an entity operating between a grid operator of an electric grid and a service provider that facilitates charging of electric vehicles. The scheduler communicates with the service provider to determine status information of electric vehicles that need charging. The status information for an electric vehicle may describe how much energy is required by the vehicle, the rate in which the vehicle can be charged, and a time when the charging of the electric vehicle needs to be completed.

The scheduler communicates status information of electric vehicles that need charging to a grid operator and requests a desired power profile from the grid operator based on the status information. The scheduler receives a power profile from the grid operator which describes a time period in which to charge the electric vehicles and the amount of available power to supply to the electric vehicles during the time period. In one embodiment, the time period described by the power profile may correspond to the time in which a renewable energy source (e.g., a wind turbine) is operating at peak energy generation.

The scheduler determines a charging profile for each electric vehicle based on the power profile provided by the grid operator. In one embodiment, a charging profile describes a schedule for charging an electric vehicle. The charging profile may comprise a time in which to begin charging the electric vehicle, a time in which to stop charging the electric vehicle, and a rate in which to charge the electric vehicle. The scheduler develops the charging profile for an electric vehicle such that the vehicle will be charged by the desired time of the associated driver while maximizing the renewable energy supplied by the electric grid. Thus, the scheduler determines schedules for charging the electric vehicles taking into account the needs of all the drivers in a manner that best suits the power profile of the electric grid. The scheduler transmits the charging profiles to the service provider who then charges each electric vehicle according to its associated charging profile.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the principles described herein.

DETAILED DESCRIPTION

System Architecture

Electric grids are operated by a grid operator that adjusts the generation levels of non-renewable power sources (e.g., fossil fuels) to allow as much renewable energy generation as possible onto the electric grid. However, grid operators may be forced to curtail renewable energy generation (e.g., turn off wind turbines) at times of the day when non-renewable energy sources have been turned down, such as during off-peak hours, due to the lack of energy demand from the grid. Thus, the energy generation from these renewable energy sources is wasted. The embodiments disclosed herein provide continuously optimized scheduling of charging for electric vehicles. The electric vehicles are charged in a manner that helps grid operators integrate renewable energy generation to prevent these renewable sources from being wasted while at the same time meeting the needs of drivers to have their cars fully charged.

Figure 1:
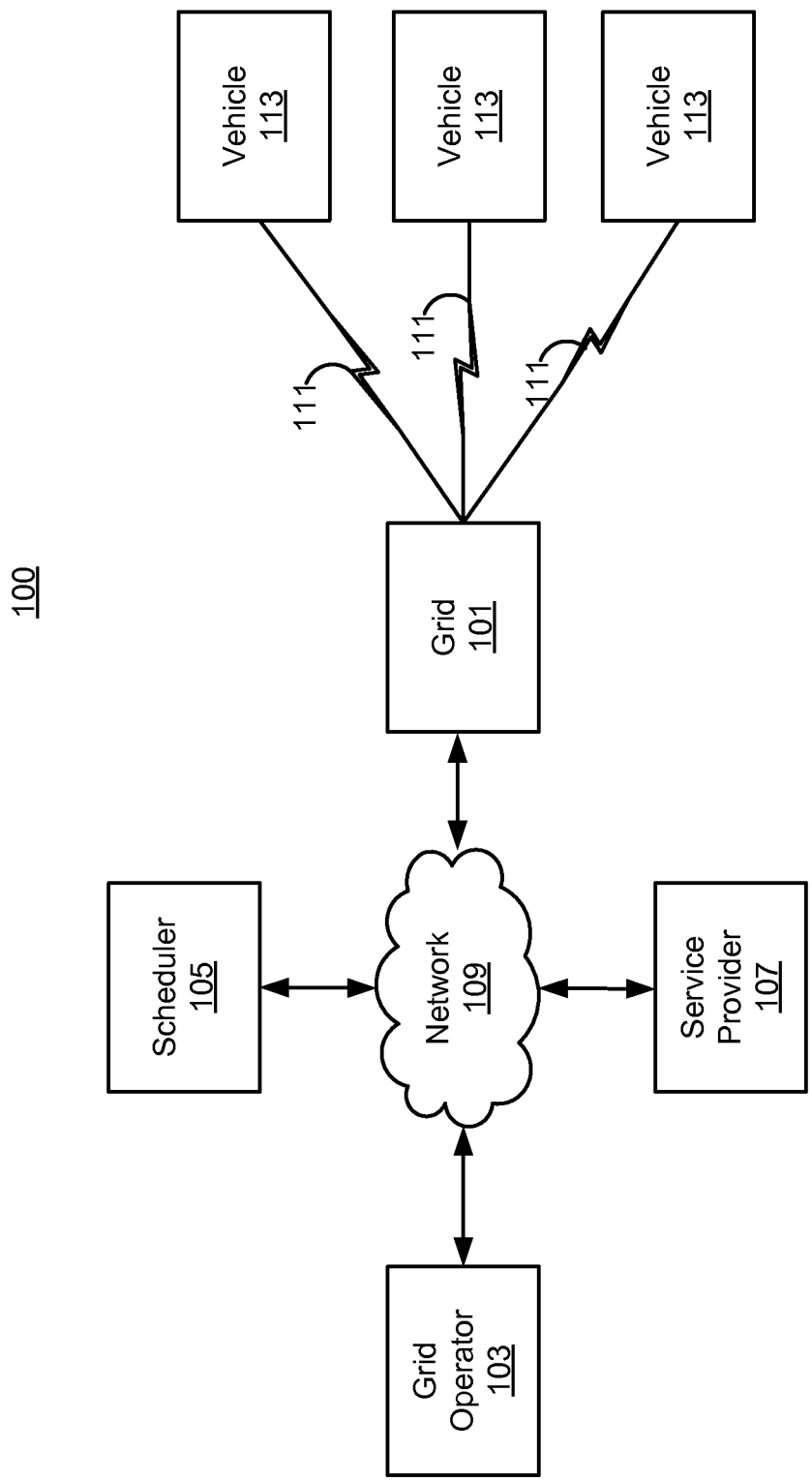
FIG. 1 illustrates an operation environment for charging electrical vehicles, according to one embodiment.

FIG. 1 illustrates an operating environment 100 for charging electric vehicles in accordance with one embodiment. Note that although the discussion herein is described with respect to electric vehicles, the embodiments are applicable to any form of plug-in vehicle such as battery powered vehicles or plug-in hybrid vehicles. The operating environment 100 comprises an electrical grid 101, a service provider 107, a grid operator 103, a scheduler 105, electric vehicles 113, and a transmission and distribution system 111, such as high voltage transmission lines, transformers, and low voltage distribution wiring, that supplies electrical power to loads. The term "load" may refer to a particular power drawing electrical component, e.g., an electric or hybrid car that is plugged into an electrical system to recharge a rechargeable battery inside the car. In the context of the description herein, the load refers to electric vehicles 113. However, the embodiments herein may be applied to any type of controllable load that has flexibility in its charging schedule.

Although not shown in FIG. 1, the grid 101 comprises one or more power plants operated by a supplier, such as an entity owning the power plants. A power plant may be, for example, based on a non-renewable energy source such as a fossil fueled power plant or a nuclear power plant. Alternatively, a power plant may be, for example, based on a renewable energy source such as a solar thermal electric plant, a solar photovoltaic power plant, a hydroelectric power plant, or a wind turbine.

The grid 101 is overseen by a grid operator 103 that manages the supply of power on the electrical grid 101. For example, the grid operator may be an entity, e.g., an Independent System Operator (ISO) or Regional Transmission Operator (RTO), that is part of, formed at the direction of, or authorized by a government regulatory agency such as the Federal Energy Regulatory Commission (FERC). The government regulatory agency coordinates, controls, and monitors the operation of the electrical power system within a geographical region such as a state or multiple states within the United States of America.

During operation of the grid 101, the grid operator 103 coordinates the supply of power available to be in balance with loads in the electrical grid 101 including electric vehicles 113. The grid operator 103 or a computer system of the operator 103 determines the amount of supply necessary and contracts with various energy suppliers to provide such power. In response to a signal sent through a communication network 109, e.g., the Internet, from a computer system of the operator 103, a computer system of the supplier can increase or decrease the power generated by a power plant supplied to the loads. That is, the grid operator 103 increases or decreases the power sent by the power plant through the transmission and distribution system 111 to the electrical grid 101, and thus to the electric vehicles 113.

In one embodiment, the grid operator 103 develops desired power profiles for charging electric vehicles 113. A power profile describes a specific time period in which to charge electric vehicles 113 and the amount of available power to supply to the electric vehicles 113 during the time period defined by the power profile. The time period may comprise a whole day or a specific time period within a given day in which to charge electric vehicles 113.

In one embodiment, the specific time period described by a power profile corresponds to a duration of time in which a renewable energy source (e.g., a wind turbine) is operating at peak energy generation. Thus, the power profile developed by the grip operator 103 maximizes the renewable energy generated by the renewable energy source. By developing the power profile based on the time period associated with peak energy generation by the renewable power source, the grid operator 103 prevents curtailing of the renewable energy source because the renewable energy is being utilized to charge electric vehicles 113.

The grid operator 103 may also develop the desired power profile based on the needs of the drivers of the electrical vehicles 113. As will be further described below, an electrical vehicle 113 may require a particular amount of energy for charging and may need to be charged by a specific time to accommodate the needs of the driver of the vehicle. The grid operator 103 may develop a desired power profile to account for the total amount of energy required to charge a plurality of electrical vehicles 113 that meet the time requirements of the drivers of the electrical vehicles 113.

Figure 2A:
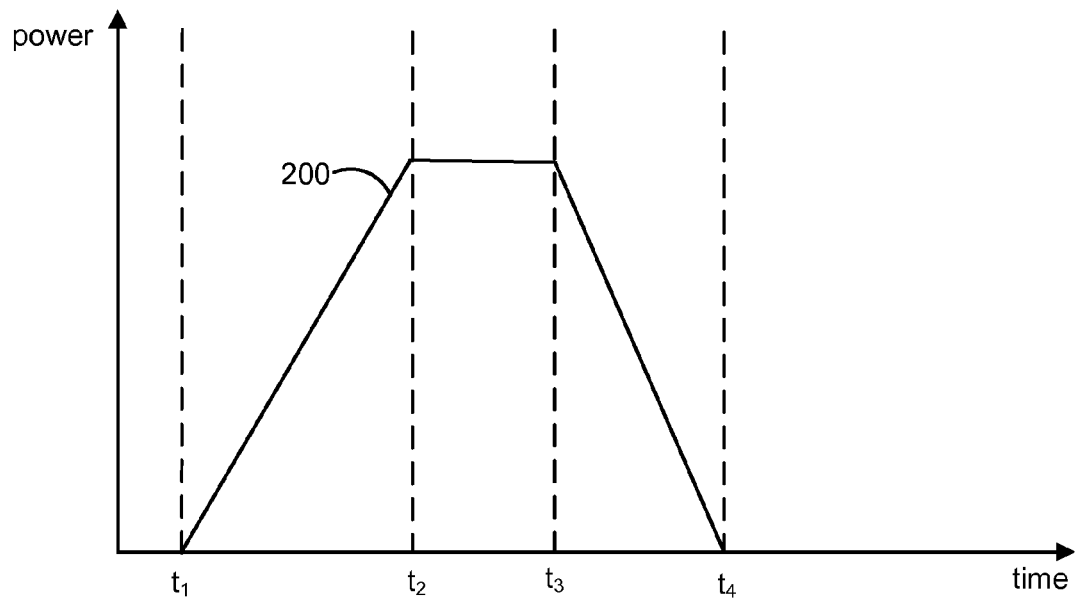
FIG. 2A and FIG. 2B respectively illustrate a power profile of an electrical grid and charging profiles of electric vehicles with respect to the power profile, according to one embodiment.

FIG. 2A illustrates an example of a power profile 200 generated by the grid operator 103. The power profile 200 is a function of time and power and is developed to coincide with the time period of peak energy generation by a renewable power source. The power profile 200 indicates that electric vehicles 113 may begin charging at time $t_1$. The amount of power available for charging electric vehicles 113 increases between time $t_1$ and time $t_2$. The maximum power generated by the renewable energy source is reached at time $t_2$ and is available for charging electric vehicles 113 until time $t_3$. From time $t_3$, the amount of renewable energy available to charge electric vehicles 113 decreases from maximum power to zero at time $t_4$. Thus, power profile 200 describes a specific time range (time $t_1$ to time $t_4$) and the amount of available power during the time range to charge electric vehicles 113.

Referring back to FIG. 1, the service provider 107 facilitates charging of electric vehicles 113. A service provider 107 may represent car companies (e.g., NISSAN) or charging station network operators (e.g., COULOMB TECHNOLOGIES). In one embodiment, the service provider 107 facilitates charging of an electric vehicle 113 according to a charging profile specific to the electric vehicle 113 as will be further described with respect to the scheduler 105. Rather than immediately charging an electric vehicle 113 when the vehicle is connected to a charging station at the service provider 107, the service provider 107 communicates with the charging station to charge the electric vehicle 113 according to its associated charging profile. Alternatively, the service provider 107 may communicate directly with electric vehicles 113 instructing the vehicles 113 to charge according to their respective charging profiles. Charging electrical vehicles 113 according to their charging profiles prevents the unnecessary charging of the electrical vehicles 113 at the same time.

As individual electric vehicles 113 are plugged into a charging station provided by the service provider 107, the service provider 107 may communicate with the electric vehicles via existing cellular data connections in the vehicles 113 or other communication means to request vehicle status information. The service provider 107 aggregates the vehicle status information into a file and communicates the aggregated vehicle status information to the scheduler 105 along with requests for charging profiles for the electric vehicles 113. In one embodiment, the service provider 107 receives one or more of the following vehicle status information from an electrical vehicle 113:

- a vehicle identifier (ID) that uniquely identifies the electric vehicle 113;
- an approximate location (e.g., geospatial identifiers) of the electric vehicle 113;
- an amount of charging energy required by the electric vehicle 113 in kilowatt hour (kWh);
- a maximum charging rate in kilowatt (kW) of the electric vehicle 113;
- an earliest time when charging of the electric vehicle 113 can begin; and a time when charging of the electric vehicle 113 needs to be completed.

In one embodiment, the amount of charging energy required by the electric vehicle 113 corresponds to an amount needed for the electrical vehicle 113 to reach full charge (i.e., maximum capacity). Alternatively, the amount of required energy may correspond to an amount that is less than the maximum capacity of the electrical vehicle 113. For example, the driver may specify that he or she only needs the electric vehicle 113 to be charged to half the maximum capacity of the electrical vehicle 113.

The earliest time when the electrical vehicle 113 can begin charging may be associated with a time when the vehicle is no longer in use by the driver and thus can begin charging and/or when the electrical vehicle 113 is plugged into a charging station. In another embodiment, the earliest time when the electrical vehicle 113 may begin charging is associated with a time at which off-peak electricity rates start. The time when charging of the electrical vehicle 113 needs to be completed is associated with when the driver needs charging of the electrical vehicle 113 to be completed so that the driver may use the vehicle. For example, the driver may specify that he or she needs the electrical vehicle 113 to be charged to the required amount by 9 AM. Alternatively, the service provider 107 may specify the time of charging completion if the driver does not provide a time for completion.

The scheduler 105 (e.g., GOOGLE INC.) is the entity operating between the grid operator 103 and the service provider 107. The scheduler 105 determines charging profiles for electric vehicles 113 in response to requests for the charging profiles from the service provider 107. In one embodiment, a charging profile for an electric vehicle 113 comprises a start time describing a time in which to begin charging the electric vehicle 113 and an end time describing a time in which to stop charging the electric vehicle 113. The start time for an electric vehicle 113 typically corresponds to a time after the electric vehicle 113 is plugged in for charging at the service provider 107. Generally, the start time corresponds to a time that allows enough time to charge the electric vehicle 113 by the desired time indicated in the status information for the vehicle 113. At the latest, the end time will correspond to the time when charging of the electric vehicle needs to be completed as indicated in the vehicle status information for the electric vehicle 113. The charging profile may further comprise a charging rate in which to charge the electric vehicle 113. The charging rate may correspond to the maximum charging rate of the electric vehicle or a rate that is less than the maximum charging rate, or a variable charging rate.

The scheduler 105 generates the charging profile for each electric vehicle 113 according to the desired power profile provided by the grid operator 103, the vehicle status information for the electric vehicle 113, and the vehicle status information for the other electric vehicles 113 that need to be charged. Particularly, the scheduler 105 determines the start time to begin charging the electric vehicle 113 based on the allocated time period for charging electric vehicles 113 described by the power profile of the grid 101, the required time that the electric vehicle 113 should be done charging, the amount of energy required by the electric vehicle 113 to reach the desired charge, and the charge rate of the electric vehicle 113. The scheduler 105 generates the charging profiles for the electric vehicles 113 to ensure that all electric vehicles 113 that need charging are charged by the required time indicated in the status information for the vehicles 113.

In one embodiment, the scheduler 105 may implement a first-fit algorithm or a best fit decreasing algorithm to determine the charging profile for each electric vehicle 113 based on the power profile provide by the grid operator 103. Once the charging profiles for the electric vehicles 111 are determined by the scheduler 105, the scheduler 105 communicates the charging profiles to the service provider 107. Note that in one embodiment, the scheduler 105 and service provider 107 may be a single entity that performs the functions described herein of the scheduler 105 and service provider 107.

In one embodiment, the scheduler 105 may update charging profiles for electric vehicles 113 that are nearing their start time for charging (i.e., vehicles that have yet to begin charging). The scheduler 105 may receive an indication from the service provider 107 that an electric vehicle 113 is scheduled to begin charging within a threshold time of the start time for the vehicle such as 1 hour from the start time. The scheduler 105 may communicate with the grid operator 103 to determine an updated power profile that accounts for current energy generating conditions of the renewable energy source. Based on the updated power profile, the scheduler 105 may generate an updated charging profile for the electric vehicle and communicate the updated charging profile to the service provider 107. The updated power profile may comprise an updated start time, updated end time, and/or updated charging rate for the electrical vehicle 113 that is distinct from the start time, end time, and/or charging rate originally specified in the charging profile for the electrical vehicle 113.

The scheduler 105 may also receive, from the service provider 107, actual charging information from the electric vehicles 113 that were charged according to the charging profiles developed by the scheduler 105. The charging information for each electrical vehicle 113 describes the actual start time in which the vehicle actually began charging, the actual end time in which the vehicle actually completed charging, and the actual rate in which the vehicle was charged. The scheduler 105 may utilize the actual charging information to better develop charging profiles for electric vehicles in the future taking into account any delays when vehicles actually began and completed charging.

Figure 2B:
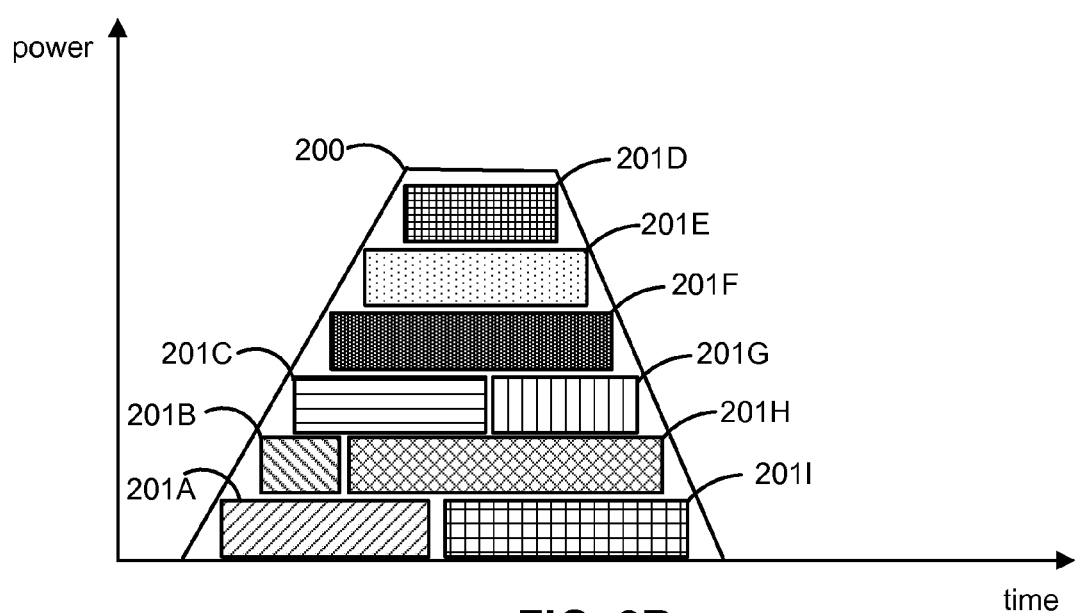

FIG. 2B illustrates the desired power profile 200 of FIG. 2A including a plurality of charging profiles 201 for electric vehicles 113 that need charging. FIG. 2B illustrates a total of 9 charging profiles 201 (201A through 201I) for electric vehicles 113. A charging profile for an electric vehicle 113 is represented by a rectangle in FIG. 2B. The width of each rectangle indicates the start time and end time in which an associated electric vehicle 113 is charged in accordance with the desired power profile 200. As shown in FIG. 2B, each of the electric vehicles 113 represented by the charging profiles begins and ends charging at different times rather than the vehicles synchronously charging at the same time until completion. The height of each rectangle indicates the rate at which the associated electric vehicle 113 will be charged. Note that although FIG. 2B illustrates a uniform rate of charging for each electric vehicle 113 for simplicity of illustration, the rate of charging may vary during the time in which the vehicle is charging or may vary from vehicle to vehicle.

Schemes for Charging Electric Vehicles

Figure 3:
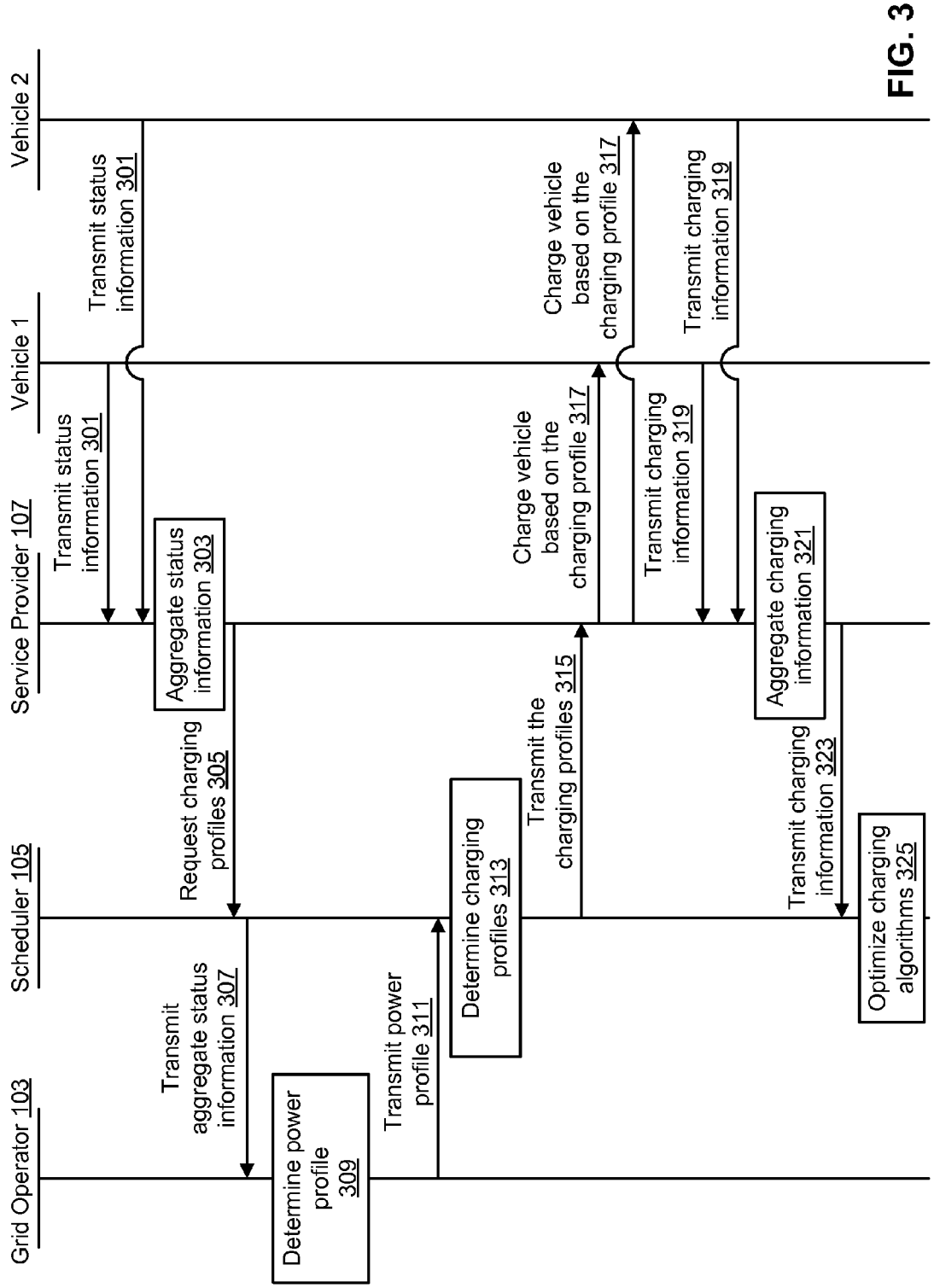
FIG. 3 illustrates an interaction diagram describing a process for charging electric vehicles, according to one embodiment.

FIG. 3 illustrates one embodiment of the interaction between the grid operator 103, scheduler 105, service provider 107, vehicle 1, and vehicle 2 to charge the vehicles. Note that in other embodiments, other steps may be performed other than those illustrated in FIG. 3.

Vehicle 1 and vehicle 2 both transmit 301 their associated status information to the service provider 107. Vehicle 1 and 2 may use their existing cellular data connections to communicate the status information to the service provider 107. As described above, the status information for each vehicle comprises a vehicle ID, the location of the vehicle, an amount of charging energy required by the vehicle, a maximum charging rate, an earliest time when the vehicle can begin charging, and a time when the vehicle should be done charging. The service provider 107 aggregates 303 the status information for vehicle 1 and vehicle 2 for communication to the scheduler 105.

The service provider 107 requests 305 charging profiles for vehicles 1 and 2. The request includes the aggregated status information for the vehicles. The scheduler 105 transmits 307 the aggregated status information to the grid operator 103. The grid operator 103 determines 309 a power profile in which to serve the energy required by vehicle 1 and vehicle 2 that takes into consideration the peak energy generation of a renewable energy source and the needs of the drivers as indicated in the aggregated status information. The grid operator 103 transmits 311 the power profile to the scheduler 105. The scheduler 105 determines 313 charging profiles for vehicle 1 and vehicle 2 based on the power profile received from the grid operator 103 and the status information of the vehicles.

The scheduler 105 transmits 315 the charging profiles to the service provider 107. The service provider 107 charges 317 vehicle 1 and vehicle 2 according to their respective charging profile which describes the start time, end time, and charging rate for each vehicle. Vehicle 1 and vehicle 2 may transmit 319 charging information to the service provider 319 indicating the actual charge start time, actual stop time, and actual rate of charge. The service provider 107 aggregates 321 the charging information and transmits 323 the charging information to the scheduler 105. Based on the charging information, the scheduler 105 may optimize 325 the charging algorithms used to determine the charging profiles for electric vehicles 313 taking into account any delay regarding when the electrical vehicles actually begin charging and finish charging.

Figure 4:
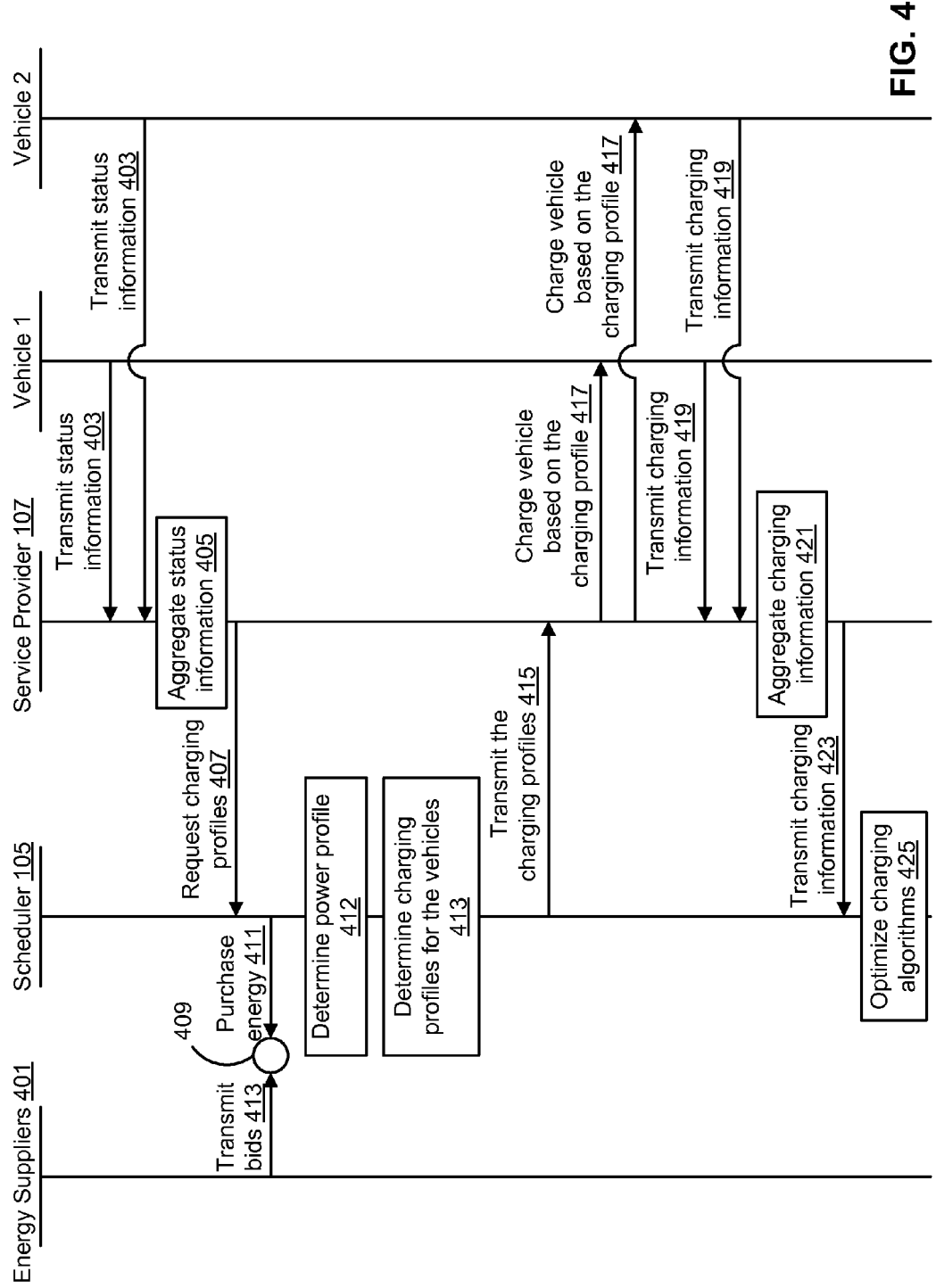
FIG. 4 illustrates an interaction diagram describing an alternative process for charging electric vehicles, according to one embodiment.

FIG. 4 illustrates one embodiment of the interaction between energy suppliers 401, the scheduler 105, service provider 107, vehicle 1, and vehicle 2 to charge the vehicles. In one embodiment, energy suppliers 401 represent various entities that supply energy for the electrical grid 101. Each energy supplier 401 submits bids describing a cost (e.g., 3 cents per kWh) of energy supplied by the energy supplier 401. The scheduler 105 purchases energy from the energy supplier 401 based on the received bids as will be described below. Note that in other embodiments, other steps may be performed other than those illustrated in FIG. 4.

Similar to FIG. 3, vehicle 1 and vehicle 2 both transmit 403 their associated status information to the service provider 107. The service provider 107 aggregates 405 the status information for vehicle 1 and vehicle 2 for communication to the scheduler 105. The service provider 107 requests 407 charging profiles for vehicles 1 and 2. The request includes the aggregated status information for the vehicles.

In one embodiment, the energy suppliers 401 transmit bids 413 to a marketplace 409. The marketplace 409 comprises a virtual location (e.g., an online website) in which energy suppliers 401 provide bids for their energy. Each energy supplier 401 includes in the bid a cost of energy supplied by the energy supplier 401. A bid may include a desired power profile in which the energy supplier 401 can provide their energy in one embodiment. The scheduler 105 purchases 411 energy from the marketplace 409 from an energy supplier 401.

In one embodiment, the scheduler 105 selects an energy supplier 401 based on the needs of the vehicles as described in the aggregated status information received from the service provider 107. The scheduler 105 may analyze the power profiles from the energy suppliers 401 to determine which energy supplier can provide energy which fits energy needs of the vehicles. That is, the scheduler 105 determines which energy supplier can supply energy to charge the vehicles by the requested time indicated in the vehicle status information. The scheduler 105 may also select an energy supplier 401 based on cost. The scheduler 105 may select an energy supplier 401 that fits the energy needs of the vehicles at the lowest cost.

Once energy is purchased, the scheduler 105 determines 412 a power profile in which energy is served to vehicle 1 and vehicle 2. Note that in alternative embodiments, the power profile included in a bid by an energy supplier 401 is utilized. The scheduler 105 then determines 413 charging profiles for vehicle 1 and vehicle 2 based on the determined power profile and the status information of the vehicles. The scheduler 105 transmits 415 the charging profiles to the service provider 107. The service provider 107 charges 417 vehicle 1 and vehicle 2 according to their respective charging profile which describes the start time, end time, and charging rate for each vehicle. Vehicle 1 and vehicle 2 may transmit 419 charging information to the service provider 107 indicating the actual charge start time, actual stop time, and actual rate of charge. The service provider 107 aggregates 421 the charging information and transmits 423 the charging information to the scheduler 105. Based on the charging information, the scheduler 105 may optimize 423 the charging algorithms used to determine the charging profiles for electric vehicles 313.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of scheduling electric vehicles for charging, the method comprising:
    receiving a request for charging profiles for a plurality of electric vehicles to be charged, wherein the request for charging profiles includes for each electric vehicle: an amount of charging energy required by the electric vehicle, a charging rate of the electric vehicle, and a time, based in part on the amount of charging energy required by the electric vehicle and the charging rate of the electric vehicle, when the charging of the electric vehicle is to be completed;
    determining the charging profiles for the plurality of electric vehicles based on an amount of power available on an electric grid for charging the plurality of electric vehicles, each charging profile indicating a time to begin charging an associated electric vehicle and a time to stop charging the electric vehicle; and
    transmitting the charging profiles to a service provider that charges the plurality of electric vehicles according to the charging profiles.

2. The computer-implemented method of claim 1, further comprising:
    receiving a power profile comprising the amount of power available on the electric grid for charging the plurality of electric vehicles and a time period in which the power is available on the electric grid;
    wherein the time period is associated with a duration of time when a renewable energy source operates at peak energy generation.

3. The computer-implemented method of claim 2, wherein the renewable energy source comprises at least one of a wind turbine, a solar photovoltaic power plant, or a solar thermal electric plant.

4. The computer-implemented method of claim 2, wherein the determination of the charging profiles is further based on the time period in which the power is available on the electric grid, a time when charging of each of the plurality of electric vehicles is to be completed, an amount of charging energy required by each of the plurality of electric vehicles, and a charging rate of each of the plurality of electric vehicles.

5. The computer-implemented method of claim 2, further comprising:
    receiving an indication of an upcoming time to begin charging an electric vehicle;
    requesting an updated power profile responsive to the indication;
    receiving the updated power profile comprising an updated amount of power available on the electric grid and an updated time period in which the power is available on the electric grid; and
    determining an updated charging profile for the electric vehicle based on the updated power profile, the updated charging profile comprising an updated time to begin charging the electric vehicle.

6. The computer-implemented method of claim 5, wherein the selected energy supplier is selected based on a time when charging of the plurality of electric vehicles is to be completed.

7. The computer-implemented method of claim 1, wherein the time to begin charging the electric vehicle is after a time when the electric vehicle is connected to a charging station and wherein the time to stop charging the electric vehicle is before the time when charging of the electric vehicle is to be completed.

8. The computer-implemented method of claim 1, wherein the time to begin charging the electric vehicle is after a time when the electric vehicle is connected to a charging station and wherein the time to stop charging the electric vehicle corresponds to the time when charging of the electric vehicle is to be completed.

9. The computer-implemented method of claim 1, further comprising:
    selecting an energy supplier from a plurality of energy suppliers that submitted bids for supplying energy for the electric grid, each bid indicative of a cost of energy supplied by an associated energy supplier; and
    determining the charging profiles for the plurality of electric vehicles based on a power profile corresponding to the energy purchased from the selected energy supplier.

10. The computer-implemented method of claim 1, wherein, for at least one vehicle, the amount of charging energy required by the electric vehicle and time the charging of the vehicle is to be completed is specified by a driver of the vehicle.

11. A computer program product comprising a non-transitory computer-readable storage medium containing executable computer program code for scheduling electric vehicles for charging, the code when executed are for:
receiving a request for charging profiles for a plurality of electric vehicles to be charged, wherein the request for charging profiles includes for each electric vehicle: an amount of charging energy required by the electric vehicle, a charging rate of the electric vehicle, and a time, based in part on the amount of charging energy required by the electric vehicle and the charging rate of the electric vehicle, when the charging of the electric vehicle is to be completed;
determining the charging profiles for the plurality of electric vehicles based on an amount of power available on an electric grid for charging the plurality of electric vehicles, each charging profile indicating a time to begin charging an associated electric vehicle and a time to stop charging the electric vehicle; and
transmitting the charging profiles to a service provider that charges the plurality of electric vehicles according to the charging profiles.

12. The computer program product of claim 11, wherein the code when executed are further for:
receiving a power profile comprising the amount of power available on the electric grid for charging the plurality of electric vehicles and a time period in which the power is available on the electric grid;
wherein the time period is associated with a duration of time when a renewable energy source operates at peak energy generation.

13. The computer program product of claim 12, wherein the renewable energy source comprises at least one of a wind turbine, a solar photovoltaic power plant, or a solar thermal electric plant.

14. The computer program product of claim 12, wherein the determination of the charging profiles is further based on the time period in which the power is available on the electric grid, a time when charging of each of the plurality of electric vehicles is to be completed, an amount of charging energy required by each of the plurality of electric vehicles, and a charging rate of each of the plurality of electric vehicles.

15. The computer program product of claim 12, wherein the code when executed are further for:
receiving an indication of an upcoming time to begin charging an electric vehicle;
requesting an updated power profile responsive to the indication;
receiving the updated power profile comprising an updated amount of power available on the electric grid and an updated time period in which the power is available on the electric grid; and
determining an updated charging profile for the electric vehicle based on the updated power profile, the updated charging profile comprising an updated time to begin charging the electric vehicle.

16. The computer program product of claim 11, wherein the time to begin charging the electric vehicle is after a time when the electric vehicle is connected to a charging station and wherein the time to stop charging the electric vehicle is before the time when charging of the electric vehicle is to be completed.

17. The computer program product of claim 11, wherein the time to begin charging the electric vehicle is after a time when the electric vehicle is connected to a charging station and wherein the time to stop charging the electric vehicle corresponds to the time when charging of the electric vehicle is to be completed.

18. The computer program product of claim 11, wherein the code when executed are further for:
selecting an energy supplier from a plurality of energy suppliers that submitted bids for supplying energy for the electric grid, each bid indicative of a cost of energy supplied by an associated energy supplier; and
determining the charging profiles for the plurality of electric vehicles based on a power profile corresponding to the energy purchased from the selected energy supplier.

19. The computer program product of claim 18, wherein the selected energy supplier is selected based on a time when charging of the plurality of electric vehicles is to be completed.

20. The computer program product of claim 11, wherein, for at least one vehicle, the amount of charging energy required by the electric vehicle and time the charging of the vehicle is to be completed is specified by a driver of the vehicle.

21. A computer system for scheduling electric vehicles for charging, the system comprising:
a computer processor;
a computer-readable storage medium comprising executable computer program code when executed by the computer processor are for:
receiving a request for charging profiles for a plurality of electric vehicles to be charged, wherein the request for charging profiles includes for each electric vehicle: an amount of charging energy required by the electric vehicle, a charging rate of the electric vehicle, and a time, based in part on the amount of charging energy required by the electric vehicle and the charging rate of the electric vehicle, when the charging of the electric vehicle is to be completed;
determining the charging profiles for the plurality of electric vehicles based on an amount of power available on an electric grid for charging the plurality of electric vehicles, each charging profile indicating a time to begin charging an associated electric vehicle and a time to stop charging the electric vehicle; and
transmitting the charging profiles to a service provider that charges the plurality of electric vehicles according to the charging profiles.

22. The computer system of claim 21, wherein the code when executed by the processor are further for:
receiving a power profile comprising the amount of power available on the electric grid for charging the plurality of electric vehicles and a time period in which the power is available on the electric grid;
wherein the time period is associated with a duration of time when a renewable energy source operates at peak energy generation.

23. The computer system of claim 22, wherein the renewable energy source comprises at least one of a wind turbine, a solar photovoltaic power plant, or a solar thermal electric plant.

24. The computer system of claim 22, wherein the determination of the charging profiles is further based on the time period in which the power is available on the electric grid, a time when charging of each of the plurality of electric vehicles is to be completed, an amount of charging energy required by each of the plurality of electric vehicles, and a charging rate of each of the plurality of electric vehicles.

25. The computer system of claim of claim 22, wherein the code when executed by the processor are further for:
- receiving an indication of an upcoming time to begin charging an electric vehicle;
- requesting an updated power profile responsive to the indication;
- receiving the updated power profile comprising an updated amount of power available on the electric grid and an updated time period in which the power is available on the electric grid; and
- determining an updated charging profile for the electric vehicle based on the updated power profile, the updated charging profile comprising an updated time to begin charging the electric vehicle.

26. The computer system of claim 21, wherein the time to begin charging the electric vehicle is after a time when the electric vehicle is connected to a charging station and wherein the time to stop charging the electric vehicle is before the time when charging of the electric vehicle is to be completed.

27. The computer system of claim 21, wherein the time to begin charging the electric vehicle is after a time when the electric vehicle is connected to a charging station and wherein the time to stop charging the electric vehicle corresponds to the time when charging of the electric vehicle is to be completed.

28. The computer system of claim 21, wherein the code when executed by the processor are further for:
- selecting an energy supplier from a plurality of energy suppliers that submitted bids for supplying energy for the electric grid, each bid indicative of a cost of energy supplied by an associated energy supplier; and
- determining the charging profiles for the plurality of electric vehicles based on a power profile corresponding to the energy purchased from the selected energy supplier.

29. The computer system of claim 28, wherein the selected energy supplier is selected based on a time when charging of the plurality of electric vehicles is to be completed.

30. The computer system of claim 21, wherein, for at least one vehicle, the amount of charging energy required by the electric vehicle and time the charging of the vehicle is to be completed is specified by a driver of the vehicle.

* * * * *